Oct. 11, 1927.

M. S. VILE 1,645,503

HANGER BOX

Filed Feb. 27, 1926

INVENTOR
Merwin S. Vile
BY
Mitchell Bechert
ATTORNEYS

Patented Oct. 11, 1927.

1,645,503

UNITED STATES PATENT OFFICE.

MERWIN S. VILE, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

HANGER BOX.

Application filed February 27, 1926. Serial No. 91,071.

My invention relates to a hanger box and the like.

It is the general object of the invention to provide a hanger box or the like having improved simple means for securing anti-friction bearing rings in place. Other objects will become apparent upon a reading of the following specification.

In the drawings which show, for illustrative purposes only, a preferred form of the invention—

In said drawings 5 indicates a shaft which is to be supported by the hanger box. 6 indicates a hanger box housing and, since both ends are substantially duplicates of each other, only one end will be described in detail. The housing is provided with a counterbored end 7 forming a seat for the outer bearing ring 8 of an anti-friction bearing, in this instance shown as a ball bearing, including the outer ring 8, an inner ring 9 and balls 10—10 interposed therebetween. It is a difficult matter to properly hold the bearing rings on a shaft and, in the past, various devices have been resorted to for that purpose. Many such devices are costly to manufacture and are not always satisfactory in service.

Figure 1:
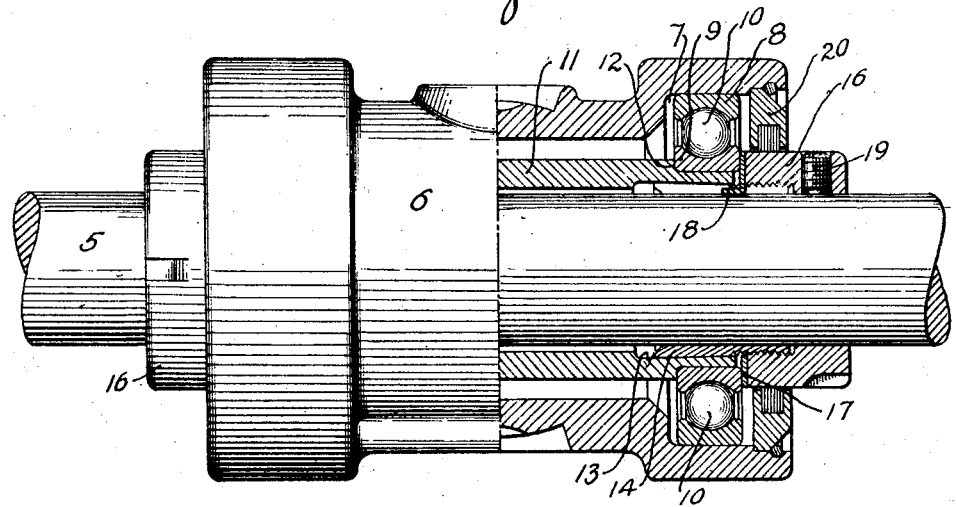
Fig. 1 is a longitudinal view in half section of a hanger box embodying features of the invention.
Figure 2:
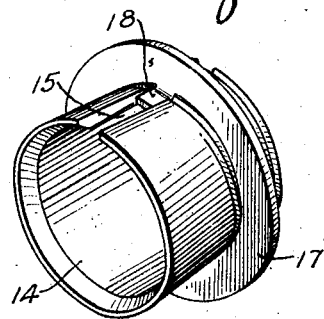
Fig. 2 is an isometric view of certain parts shown in Fig. 1.

In my improved form of holding means, I employ a sleeve 11 which extends from one end of the housing to the other. This sleeve, in the form shown, has a turned down portion at the end to form a seat for the bore of the inner bearing ring 9, and a shoulder 12 may be provided for limiting the inward movement of the inner bearing ring on the sleeve. As shown the ring 9 is slightly wider than the distance from the shoulder 12 to the end of the sleeve and therefore projects somewhat beyond the end of the sleeve for a purpose to be later described. The sleeve has a tapered bore 13 at the end, the large end of the bore being inwardly from the end, and the smaller end of the bore being toward the end; that is, the tapered bore converges outwardly. A tapered adapter wedge 14 has an outer surface to fit the tapered bore 13, and an inner surface which fits the shaft 5. One of the members, preferably the adapter wedge 14, is slotted, as indicated at 15, and this slot may extend either throughout the length thereof or throughout a sufficient portion thereof to permit the wedge to be compressed and assembled with the sleeve 11 before the same is applied to the shaft 5. When the adapter 14 and sleeve 11 are assembled as shown in Fig. 1, both may be passed over a shaft, the shaft and the tapered surfaces thereafter preventing the wedge from being withdrawn from the sleeve. The wedge 14 preferably extends a considerable distance beyond the end of the sleeve and may be threaded to receive a nut 16, which serves to draw the wedge outwardly and thus cause the sleeve to be frictionally held against rotation on the shaft, as will be understood. The nut 16 performs the further function of acting against the edge of the inner bearing ring 9 and when screwed up serves to hold the inner ring securely on the sleeve. In the form shown, I interpose a lock washer 17, which may be in the form of a steel stamping, between the nut 16 and the inner ring 9. The lock washer may have a tongue or key 18 thereon fitting in the slot 15 in the adapter sleeve, so as to prevent the washer from rotating on the sleeve. When the nut 16 is screwed up, there is no tendency for it to become accidentally unscrewed since it acts against the face of the washer 17, which is non-rotatably held on the wedge adapter. As a further security, a set screw 19, or the like, may be used for holding the nut 16 in place on the shaft.

Any suitable type of dust ring 20 may be provided for excluding dust and dirt from the bearing surfaces. In the form shown, this dust ring surrounds and preferably engages the surface of the nut 16.

From the foregoing description it will be plain that the inner bearing rings at each end of the housing will be rigidly held on a single sleeve, which sleeve will be rigidly clamped to and therefore rotatable with the shaft passing through the housing and sleeve. The effect of this sleeve is to give a very long and substantial bearing of the inner rings upon the shaft and to accurately position the inner rings relatively to each other. As shown, the outer rings are mounted in counterbored seats and these seats are preferably of substantially greater longitudinal extent than the width of the outer rings so as to permit a "floating" of the housing relatively to the shaft. This avoids any cramping of the anti-friction bearing members on their respective races. By the means herein disclosed, I am further able to use standard radial ball bearings for example, and to attain many of the advantages of a special very long inner bearing ring fitting upon a shaft.

While an illustrative form of the invention has been described in detail, I do not wish to be strictly limited to the form shown since obviously changes may be made within the scope of the invention as defined in the appended claims.

I claim:

1. In a hanger box, a housing having a radial anti-friction bearing at each end and including inner and outer bearing rings with anti-friction bearing members interposed therebetween, a sleeve within said housing and extending from one bearing to the other, the inner ring of each bearing being mounted on said sleeve, said sleeve having a shoulder to limit the inward movement of each said bearing ring, said sleeve at each end having an internal tapered bore with the small end extending outwardly, a split tapered adapter wedge fitting said tapered bore and having one end projecting to the outside thereof, a nut threaded on the projecting end of said adapter wedge, said nut serving to force said inner bearing ring against said shoulder on said sleeve, said nut further serving to draw said adapter wedge to cause it to frictionally engage the bore of said sleeve and a shaft passing through said adapter wedge and loosely through said sleeve, whereby said sleeve and said inner rings may be caused to rotate with said shaft.

2. In the combination defined in claim 1, and a lock washer non-rotatably secured relatively to said wedge adapter and engaged by said nut whereby the latter is prevented from accidentally working loose.

3. In the combination defined in claim 1, and means for preventing rotation of said nut on a shaft passing through said adapter wedge.

4. In a hanger box, a housing having a seat at each end for receiving the outer ring of an anti-friction bearing, a sleeve within said housing and having an anti-friction bearing mounted on each end thereof, said bearings each including inner and outer rings, said inner rings being mounted on the ends of said sleeve and projecting beyond the ends thereof, and said outer rings being seated in said housing, said sleeve at each end having a tapered bore with the taper converging toward the adjacent end, a split tapered adapter sleeve in each said bore, a lock washer on said tapered adapter sleeve and having a tongue extending in the slot of said adapter sleeve, a nut threaded on the end of said adapter sleeve, said lock washer being positioned between said nut and one edge of the inner ring of each said anti-friction bearing, whereby when said nut is screwed up, said inner bearing ring will be rigidly held on said sleeve, and said nut will be prevented by said lock washer from accidentally working loose, and a dust ring in each end of said housing and surrounding said nut.

5. In a bearing, a sleeve, a tapered adapter wedge, one of said members being longitudinally slotted, said sleeve having an internal tapered bore therein to fit said wedge, an inner bearing ring mounted on said sleeve, a nut to move said wedge to cause the latter to bind on said sleeve and a shaft, and a lock washer for said nut, said lock washer having a tongue fitting in the slot of said longitudinally slotted member for holding said washer against rotation thereon.

MERWIN S. VILE.